Feb. 4, 1958     F. E. BUTTERFIELD     2,822,542
DIRECTIVE ANTENNA
Filed Oct. 18, 1954     2 Sheets-Sheet 1
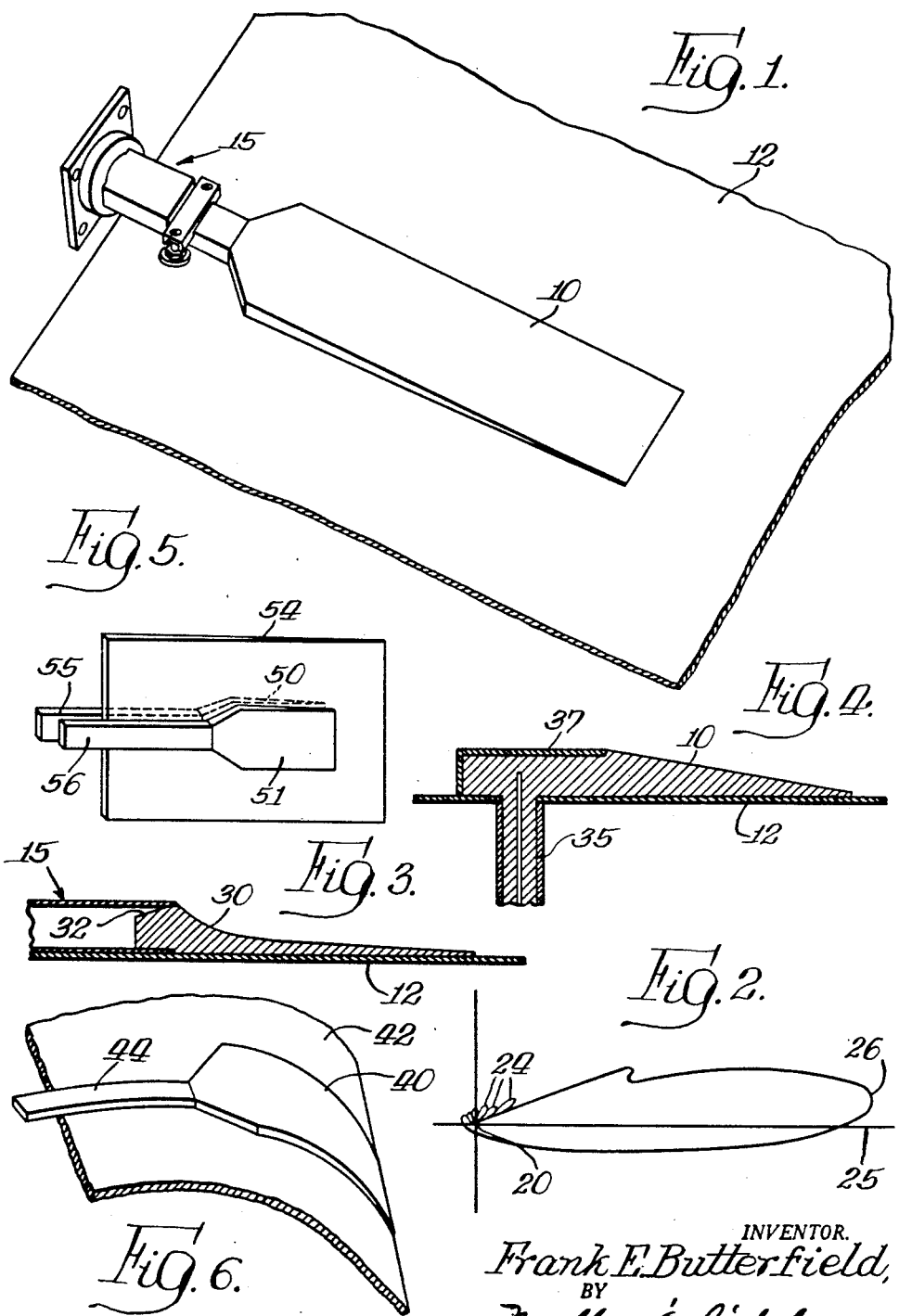
INVENTOR.
Frank E. Butterfield,
BY
Mueller & Aichele
Atty's.

Feb. 4, 1958  F. E. BUTTERFIELD  2,822,542
DIRECTIVE ANTENNA
Filed Oct. 18, 1954  2 Sheets-Sheet 2
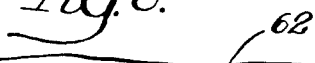
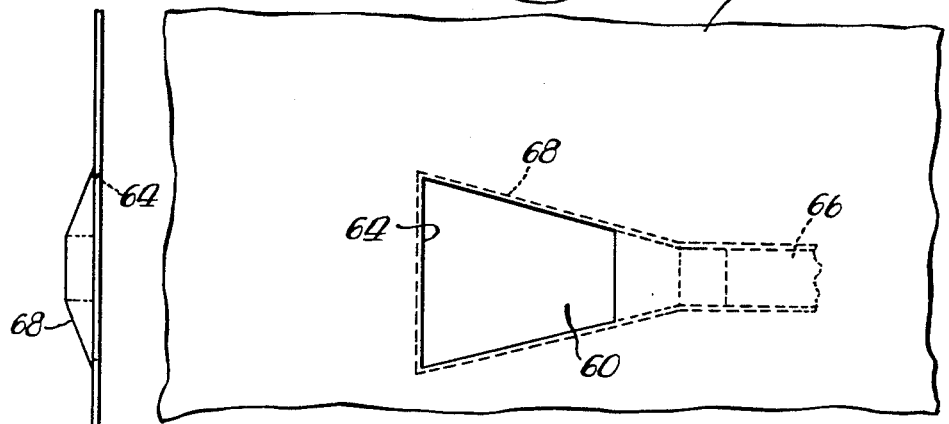
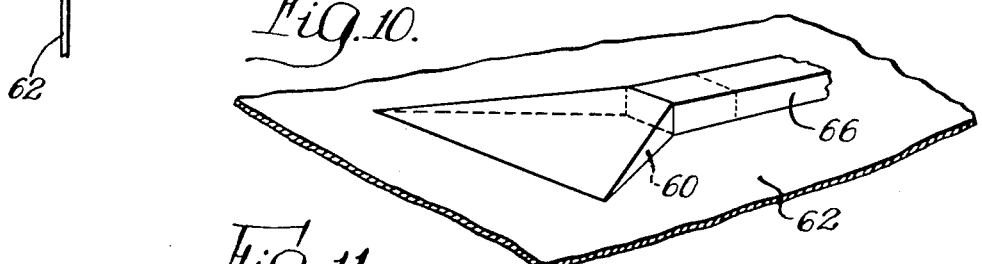
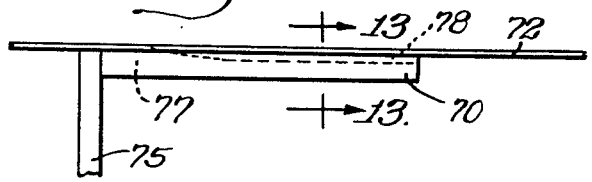
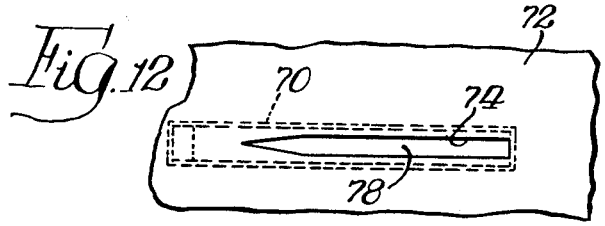
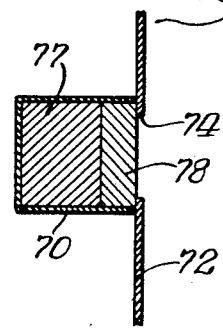
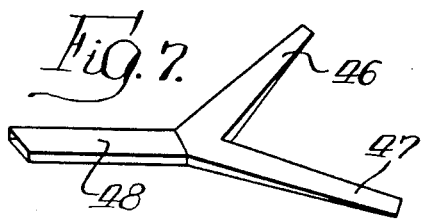
INVENTOR.
Frank E. Butterfield
BY
Mueller & Aichele
Attys.

United States Patent Office 2,822,542
Patented Feb. 4, 1958

2,822,542
DIRECTIVE ANTENNA

Frank E. Butterfield, Mountain View, Calif., assignor to Motorola, Inc., Chicago, Ill., a corporation of Illinois Application October 18, 1954, Serial No. 462,893

8 Claims. (Cl. 343—785)

This invention relates generally to wave signal antenna apparatus, and more particularly to an improved directional antenna for high frequency electromagnetic waves.

Various types of structures are in common use to provide directional radiation of high frequency wave signal energy. While many such devices perform properly in some applications, the prior art antennas suitable for mounting on vehicles or aircraft have not been entirely satisfactory. It is apparent that special consideration must be taken into account for such radiators. Among these are the additional drag or wind resistance caused by a projection from the outer surface of rapidly moving objects and the fact that rugged construction of the device itself is necessary so that it may withstand strains produced by the high air velocity encountered. This has led to the use of domes or shields for surrounding the radiator apparatus. However, such shields do produce some wind resistance and frequently the electrical characteristics of the radiator are disturbed by such devices. Therefore it is apparent that aside from the pure mechanical considerations, electrical problems are also encountered in providing the optimum design for antennas used on high speed devices. Additional electrical features which are advantageous in general but which may deserve special consideration in radiators for vehicles include the provision of a directional pattern so that radiation takes place in only a selected direction, such as at a given angle with respect to the body surface of a vehicle. In addition, simplicity and efficiency in coupling signals to the antenna is important so that economy and performance are maximized.

An object of the present invention is to provide an antenna which is particularly suitable for mounting on high speed vehicles and which constitutes a successful design meeting the above-mentioned considerations.

It is another object of this invention to provide an antenna radiator for use on high speed devices which produces nearly tangential radiation from a surface of such a device and which causes a reduced amount of wind resistance.

A further object of the invention is to provide a rugged surface mounted antenna which closely conforms to the mounting surface so as to provide low wind resistance during motion of the surface and antenna.

Still another object is to provide a high frequency wave signal radiator which is of small size and inexpensive construction since only a minimum of easily formed components are utilized in the construction thereof.

A still further object is to provide a high frequency wave signal radiator to which signals may be easily and efficiently coupled and which radiates in a highly directional pattern.

A feature of the invention is the provision of a wave signal radiator, the radiation portion of which is constructed of dielectric material, so that it may be easily and precisely formed into the desired shape.

A further feature of the invention is the provision of an antenna including a single radiating member composed of dielectric material which is secured to a mounting surface and has a relatively thick end portion to which signals to be radiated are applied and which has a tapered portion extending away from the aforementioned thick end portion to provide radiation of the signals in the desired direction. The tapered portion may extend in essentially an exponential curve to provide highly desirable radiation characteristics of the antenna.

Another feature of the invention is the provision of an electromagnetic radiation device which includes a wedge shaped dielectric radiating member with a fixed portion of the wedge shape extending into a coupling waveguide to provide a suitable impedance match and vapor sealing for the waveguide.

A still further feature is the provision of a wave signal radiator including a dielectric member of selected configuration secured beneath an aperture in a mounting surface along which surface it is desired that radiation take place. The dielectric member may be composed of a plurality of sections having selected intrinsic impedances to provide optimum matching between a feeding waveguide and free space.

Still another feature of the invention is the provision of an electromagnetic radiation device including a radiation member composed of dielectric material which is secured to a mounting surface along which it is desired that radiation take place, with the dielectric material being partially encased in a conductor housing to promote efficiency and proper radiation from the device.

Further objects, features and the attending advantages thereof will be apparent upon consideration of the following description when taken in conjunction with the accompanying drawings in which:

Fig. 1 illustrates a perspective view of a wave signal radiator constructed in accordance with the present invention;

Fig. 2 illustrates a pattern of radiation from the radiator shown in Fig. 1;

Fig. 3 is a cross-sectional view of an alternate construction of the radiator of Fig. 1;

Fig. 4 is a cross-sectional view of the antenna of Fig. 1 but utilizing a different energy supply structure;

Fig. 5 illustrates a pair of radiators mounted on opposite sides of a mounting surface;

Fig. 6 illustrates a radiator secured to a curved surface;

Fig. 7 illustrates a branched form of the wave signal radiator;

Fig. 8 illustrates a plan view of the wave signal radiator as mounted on the underside of a mounting surface;

Fig. 9 illustrates an end view of the radiator of Fig. 8;

Fig. 10 shows a perspective view of the underside of the radiator of Fig. 8;

Fig. 11 illustrates an elevational view of a further wave signal radiator mounted on the underside of a mounting surface;

Fig. 12 illustrates a plan view of the radiator of Fig. 11; and

Fig. 13 illustrates a cross-sectional view taken along the line 13—13 of Fig. 11.

In practicing the invention there is provided a wave signal radiator, or antenna, suitable for use at microwave frequencies, and which includes an elongated dielectric radiating member secured to a conductor surface such as the body surface of a fast moving vehicle. Signals are applied to the radiating member by a suitable waveguide, coaxial cable, or the like. The dielectric radiating member has a selected shape which may be that of a long straight wedge or an exponential taper with the thick end of the member being fed by the signal feeding means and the slim end providing radiation of the signals substantially parallel to the surface to which the member is secured. The radiating member may be mounted below a surface to radiate through an aperture therein as well as being directly secured to the outside of such a surface. The radiating member also may be partially surrounded by a metallic sheath to promote efficient radiation therefrom. When the radiating member is fed by a waveguide, this member may extend partially within the waveguide in order to provide efficient impedance matching as well as to form a vapor seal for the waveguide should gas be used therein. In a further embodiment of the invention the dielectric radiating member is composed of a plurality of dielectric materials having differing impedances ranging between that of the signal feeding means and that of free space so that the efficiency of the release of energy from the signal feeding means to free space is improved.

Turning now to the drawings, there is shown in Fig. 1 a dielectric radiating member 10 which is bonded to an electrically conductive surface 12 and is coupled to a waveguide 15. It may be noted that the radiating member 10 is in a wedge shape with the large end thereof being in engagement with waveguide 15 so that signals may be applied to the radiating member. The conducting surface 12, of course, could be the wing or fuselage of an airplane, the top of an automobile, or the like. Radiating member 10 is composed of a suitable dielectric material such as plastic or fiber glass and is secured to the surface 12 by a bonding material or even by rivets since slight air gaps will not unduly impair operation of the antenna. It is also possible to install member 10 in a slight depression of surface 12 so that it more nearly conforms to the contour thereof.

The graph of Fig. 2 illustrates the radiation pattern of the antenna radiator of Fig. 1 when plotted in a plane perpendicular to the surface 12, with the radiator located at point 20 and line 25 along surface 12 with the wedge pointing to the right. It may be noted that various small lobes 24 are produced near the location of the radiator but that the maximum radiation occurs at point 26 which is at a small angle of elevation with respect to the surface 12. However, very nearly maximum radiation occurs along line 25, i. e. tangent to mounting surface 12. Radiation in a plane parallel to the surface 12 is generally symmetrical about the dielectric radiating member 10 and reaches a maximum at point 26 as shown in Fig. 2.

Fig. 3 illustrates a cross-sectional view of a dielectric radiating member 30 which is exponentially tapered and has a portion 32 which extends into waveguide 15. The taper of radiating member 30 as shown is such that the thickness at any point is essentially inversely proportional to the distance of that point from the waveguide 15. In a practical construction of the invention the thin end of the radiating member 30 may terminate in a thickness of approximately $\frac{1}{32}$ to $\frac{1}{64}$ of an inch without detracting from the performance. Advantages are secured in utilizing the taper as shown, which is substantially exponential, in that the radiation occurs uniformly in straight lines from the taper and in that it approximates the taper which provides maximum gain with the antenna. Additional forms of the invention to be described presently may be formed with either the linear or the exponential tapers. Shaping in this exponential manner tends to reduce the side lobe production thereby improving the radiation pattern. In this regard it should be mentioned that side lobe production is further affected by the size of the mounting surface, the termination of which causes diffraction of the radiated wave, the best radiation being realized when the surface is large compared to the size of the radiating member. Side lobe production is also influenced by independent radiation from the feeding waveguide which radiation is minimized by this invention.

Energy may be coupled to the radiating member by direct connection to the waveguide, or the radiating member may have a short tapered portion extending into the waveguide as shown at 32 in Fig. 3. For matching to a particular waveguide, an optimum thickness of the radiating member will be found and matching to the waveguide can be further accomplished by the use of a tapered portion 32 as shown or a stepped transition in the section of the radiating member projecting into the waveguide. The section 32 may also function as a vapor seal for the waveguide if this is required.

Fig. 4 illustrates a cross-sectional view of a dielectric radiating member such as 10 of Fig. 1 when fed by a coaxial cable 35. In this case it is seen that the energy may be conducted to the radiating member at right angles to the surface 12 and that a conductive sheet 37 is installed around the thick end portion of the dielectric radiating member which joins to the waveguide 35.

As shown in Fig. 5 it is also possible to employ a pair of dielectric radiating members 50 and 51 on opposite sides of a mounting surface 54 and apply energy to both by waveguides 55 and 56 respectively.

Figs. 6 and 7 illustrate additional embodiments of the invention which find utility in certain applications. In Fig. 6 it may be noted that the dielectric radiating member 40 is positioned on a curved surface 42 and that energy is supplied by the waveguide coupler 44. This form of the invention would find use in conjunction with certain vehicular surfaces such as airplane wings when tangential radiation therefrom is desired.

The structure of Fig. 7 illustrates a branched dielectric radiating member having arm portions 46 and 47 which converge at the termination of waveguide 48. This of course would provide a modified radiation pattern desirable in some applications.

Figs. 8–10 illustrate an embodiment of the invention in which the dielectric radiating member 60 is secured to the underside of the mounting surface 62 in which there is an aperture 64. The radiating member 60 receives energy from the waveguide 66 into which a section of the thick end of the dielectric radiating member extends. In this structure radiation occurs from the base or flat side of the radiating member 60 rather than from the tapered side thereof, and the radiation pattern would be quite similar to that shown in Fig. 2. However, in this embodiment rather than leave the radiating member exposed on the underside of surface 62, it is enclosed within an electrically conductive housing 68 which promotes radiation through the opening 64 in the desired fashion, that is, substantially along the plane of surface 62. Of course the dielectric radiating member 60 may also take the shape of the radiating member 10 of Fig. 1 rather than the flared shape as shown and it may be coupled to the waveguide 66 in other forms such as by the tapered portion 32 of Fig. 3 or by merely terminating it at the end of waveguide 66.

A further embodiment of the invention is shown in Figs. 11–13 in which an electrically conductive housing 70 is secured to the underside of a mounting surface 72 in which there is an elongated aperture 74. Radiation occurs through aperture 74 and the energy is conducted thereto through a suitable energy coupling device 75 connected to the dielectric member 77. The intrinsic impedance of the dielectric member 77 is selected to provide a proper match for the energy coupling means 75. However since this will in general provide very poor impedance matching with free space, a dielectric radiating member 78 is utilized between the dielectric member 77 and the free space as presented through aperture 74. The intrinsic impedance of the dielectric radiating member 78 is intermediate that of the dielectric member 77 and that of free space so that the release of energy from the entire radiating device is greatly facilitated. Member 78 may include a tapered portion as shown to provide efficient radiation.

The invention provides therefore a simple and effective microwave antenna or wave signal radiator which is particularly suitable for use with high speed vehicles and the like since only rugged components of small size need be installed on the outer surface of such vehicles.

The wind resistance will be reduced considerably due to the shape of the radiator and the expense of construction will be low since the radiating member proper is composed of a dielectric material which is easily fabricated and does not require the machining that various metal components would necessitate. The wave signal radiator is further advantageous in that it is easily supplied with energy by means of a waveguide, coaxial cable, or the like and satisfactory impedance matching is provided with the various forms and coupling. Furthermore, the invention provides a highly directional and comparatively narrow radiation pattern which is substantially parallel to the mounting surface of the antenna structure, a pattern which is desirable in many applications.

While particular embodiments of the invention have been shown and described to illustrate the same, it is understood that changes may be made within the scope of the invention and it is intended to cover all such changes and modifications which fall within the true scope of the invention as defined in the appended claims.

What is claimed is:

1. Wave signal antenna apparatus for transferring of high frequency electromagnetic wave signals in a given relation with respect to a selected surface such as a vehicle body, said apparatus including in combination, an electrically conductive mounting surface, wave signal coupling means having an output portion for conducting high frequency electromagnetic wave signals to be transferred, and an elongated dielectric member having a base section secured to said mounting surface, a relatively thick coupling portion engaging said output portion of said wave signal coupling means for deriving wave signals therefrom, and a transfer portion exposed to free space and tapered toward said mounting surface, whereby wave signals may be transferred by said dielectric member with maximum transfer substantially tangent to said mounting surface.

2. Wave signal antenna apparatus for transferring high frequency wave signals substantially along a given surface, said apparatus including in combination, a mounting surface of electrically conductive material, signal coupling means having an end terminal, and an elongated wedge-shaped member composed of dielectric material with the thick end of said member reduced into engagement with said end terminal of said signal coupling means and the base of said member disposed upon said mounting surface, said wedge-shaped member having the wedge surface thereof sloping toward said mounting surface, whereby high frequency wave signals are transferred between said signal coupling means and said member and between the wedge surface of said member and space substantially along said mounting surface.

3. Wave signal antenna apparatus for transferring high frequency waves substantially tangent to a given surface, said apparatus including in combination, a mounting surface of electrically conductive material, wave guide means having an end terminal to conduct high frequency waves, and a wedge-shaped member composed of dielectric material with the thick end of said member extending into said wave guide means and the base of said member disposed upon said mounting surface, the wedge surface of said member being tapered toward said mounting surface, whereby high frequency waves are transferred between said wedge-shaped member and said wave guide means and between the wedge surface of said wedge-shaped member and space substantially tangent to said surface and said thick end of said wedge-shaped member provides impedance matching and a vapor seal for said wave guide means.

4. Wave signal antenna apparatus for transferring high frequency wave signals along a given surface, said apparatus including in combination, a mounting surface of electrically conductive material, signal coupling means having a terminal for conducting high frequency wave signals, and an elongated tapered member composed of dielectric material with the thick end of said member engaging said terminal of said signal coupling means, the base of said member disposed upon said mounting surface, and the taper of said member sloping toward said mounting surface and being such that the thickness at any point is substantially inversely proportional to the distance of that point from the point of engagement of said member and said signal coupling means, whereby high frequency wave signals conducted by said signal coupling means are transferred substantially along said mounting surface by the tapered surface of said member.

5. A wave signal antenna for transferring high frequency waves at a selected angle to a given surface, said antenna including in combination, an extended mounting surface of electrically conductive material, coaxial conductor means disposed at substantially right angles to said mounting surface and having an end terminal for conducting high frequency waves, and a wedge-shaped member composed of dielectric material with the thick end of said member joined to said coaxial conductor means and the base of said member disposed upon said mounting surface, the wedge-shaped surface of said member being sloped toward said mounting surface, whereby high frequency waves conducted by said coaxial conductor means are transferred at a selected angle to said surface by the wedge-shaped surface of said member.

6. A wave signal antenna for transferring high frequency waves in given relation to a surface, said antenna including in combination, a mounting surface of electrically conductive material, signal coupling means having an end terminal, and a pair of wedge-shaped members composed of dielectric material with a common thick end thereof engaging said terminal of said signal coupling means and the bases thereof disposed upon said mounting surface, said members having wedge surfaces thereof sloping toward said mounting surface whereby high frequency waves are conducted by said signal coupling means and are transferred in given relation substantially along said surface.

7. Wave signal antenna apparatus for transferring high frequency wave signals along a given surface such as an airplane wing, said apparatus including in combination, a curved mounting surface of electrically conductive material, signal conducting means having an end terminal, and a curved wedge-shaped member composed of dielectric material with the thick end of said member engaging said end terminal of said signal supply means, and the base of said member having a curve corresponding to that of said curved surface and being bonded thereto, the wedge surface of said member sloping toward said mounting surface, whereby high frequency wave signals conducted by said signal supply means are transferred by the wedge surface of said wedge-shaped member.

8. Wave signal antenna apparatus for transfer of high frequency electromagnetic wave signals in a given relation with respect to a selected surface, said apparatus including in combination, an extended electrically conductive mounting surface, wave guide signal coupling means having an output portion to conduct high frequency electromagnetic wave signals, and a wedge-shaped member of dielectric material having a base section bonded to said mounting surface, a thick end portion tapered into engagement with said output portion of said wave guide signal coupling means providing an impedance match thereto and a radiating portion comprising a sloping surface uniformly tapered toward said mounting surface and exposed to free space, whereby wave signals are transferred between said wedge-shaped member of dielectric material and space substantially along said mounting surface.

References Cited in the file of this patent

UNITED STATES PATENTS

| | | |
|---|---|---|
| 2,415,352 | Iams | Feb. 4, 1947 |
| 2,648,002 | Eaton | Aug. 4, 1953 |